(12) United States Patent
Dinger

(10) Patent No.: US 12,240,591 B2
(45) Date of Patent: Mar. 4, 2025

(54) FLY-BY-WIRE SERVO ACTUATOR FOR PRIMARY FLIGHT CONTROL

(71) Applicant: Garmin International, Inc., Olathe, KS (US)

(72) Inventor: Perry L. Dinger, Olathe, KS (US)

(73) Assignee: Garmin International, Inc., Olathe, KS (US)

( * ) Notice: Subject to any disclaimer, the term of this patent is extended or adjusted under 35 U.S.C. 154(b) by 44 days.

(21) Appl. No.: 18/232,173

(22) Filed: Aug. 9, 2023

(65) Prior Publication Data

US 2023/0382517 A1 Nov. 30, 2023

(51) Int. Cl.
*F16H 49/00* (2006.01)
*B64C 13/50* (2006.01)

(52) U.S. Cl.
CPC ......... *B64C 13/505* (2018.01); *F16H 49/001* (2013.01)

(58) Field of Classification Search
CPC ............................ F16H 49/001; B64C 13/505
USPC ................................................ 74/640, 665 A
See application file for complete search history.

(56) References Cited

U.S. PATENT DOCUMENTS

| | | | | |
|---|---|---|---|---|
| 3,565,006 A * | 2/1971 | Stewart | ................... | B41F 13/14 |
| | | | | 101/248 |
| 8,230,750 B2 * | 7/2012 | Flatt | ...................... | B64C 13/341 |
| | | | | 244/99.2 |
| 8,794,865 B2 * | 8/2014 | Stadler | .................. | E01F 13/046 |
| | | | | 404/6 |
| 2003/0127569 A1 * | 7/2003 | Bacon | ................... | B64C 13/505 |
| | | | | 244/195 |
| 2006/0048602 A1 * | 3/2006 | Biester | .................... | F16H 25/20 |
| | | | | 74/841 |
| 2006/0113933 A1 * | 6/2006 | Blanding | ............... | H02K 7/116 |
| | | | | 318/116 |
| 2010/0029428 A1 * | 2/2010 | Abe | ........................ | H02K 51/00 |
| | | | | 903/910 |
| 2016/0103295 A1 * | 4/2016 | Zhang | .................... | G02B 7/005 |
| | | | | 74/89.29 |
| 2022/0325764 A1 | 10/2022 | Manzanares et al. | | |

* cited by examiner

*Primary Examiner* — Ha Dinh Ho
(74) *Attorney, Agent, or Firm* — Samuel M. Korte; Max M. Ali

(57) ABSTRACT

A fly-by-wire (FBW) servo actuator may be used for primary flight control for an aircraft. The FBW servo actuator may have an inner output shaft coupled to an output arm that actuates a control surface of the aircraft. A first differential and a second differential may be coupled to the output shaft via a first outer shaft and a second outer shaft, respectively. Two inputs may be provided to each of the two differentials, and each input may be driven by a distinct motor. Thus, if one of the motors fails, the other motors may allow for uninterrupted operation of the servo actuator. The differentials may comprise harmonic gears driven by the two inputs. The inputs may be applied to a wave generator and a circular spline of the harmonic gear, and a flex spline of the harmonic gear may drive the outer shaft.

6 Claims, 15 Drawing Sheets

FLY-BY-WIRE SERVO ACTUATOR FOR PRIMARY FLIGHT CONTROL

FIELD

Embodiments of the present disclosure are generally directed to servo actuators. More specifically, embodiments of the present disclosure are directed to fly-by-wire (FBW) servo actuators for primary flight control for aircraft.

BACKGROUND

Servo actuators are often used for position control in a variety of electro-mechanical systems. For example, servo actuators may be used to control the motion of vehicles such as aircraft, spacecraft, watercraft, and other vehicles. The servo actuators may be a part of a motion control system for a vehicle that controls the motion of the vehicle without continuous input. For example, in an aircraft, servo actuators may control the position of control surfaces (e.g., ailerons, elevators, rudders, etc.) to maintain the position of the aircraft based on a discrete input without requiring an operator to apply constant input.

For flight control in an aircraft, two servo actuators are often used to provide redundancy in case of failure. The two servo actuators work in tandem and communicate with one another to correctly actuate the control surface. The actuators are typically hydraulic or linear using a ball or lead screw. The two servo actuators are typically housed in separate housings, which may increase latency in the communications. Furthermore, in FBW systems, a latency increase is seen when communicating to separate servo actuators.

SUMMARY

Embodiments of the present disclosure are generally directed to a servo actuator for actuating control surfaces on a vehicle, such as for primary flight control in FBW aircraft. The servo actuator may provide rotary output to an output arm to actuate a control surface. The servo actuator may comprise two differentials, and each differential may comprise two distinct inputs powered by distinct motors such that the servo actuator comprises four motors total. Thus, failure in one of the four motors may be compensated by the remaining three motors. The differentials may comprise harmonic gears (also known as strain wave gears) in which a circular spline is driven by a first gear coupled to a motor, a wave generator is driven by a second gear coupled to a motor or by a direct drive motor, and a flex spline is the differential output. The flex spline may drive an output shaft coupled to the output arm for actuation of the control surface.

In some embodiments, the techniques described herein relate to a fly-by-wire servo actuator for an aircraft, including: a first outer shaft and a second outer shaft; an inner output shaft received within the first outer shaft and the second outer shaft and configured to be drive by the first outer shaft and the second outer shaft; an output arm coupled to the inner output shaft, the output arm configured to actuate a control surface of the aircraft; a first differential configured to drive the first outer shaft, the first differential including: a first harmonic gear including a first wave generator, a first flex spline coupled to the first outer shaft, and a first circular spline; a first outer gear coupled to the first circular spline and driven by a first motor to drive the first circular spline; and a first inner gear coupled to the first wave generator and driven by a second motor to drive the first wave generator; and a second differential configured to drive the second outer shaft, the second differential including: a second harmonic gear including a second wave generator, a second flex spline coupled to the second outer shaft, and a second circular spline; a second outer gear coupled to the second circular spline and driven by a third motor to drive the second circular spline; and a second inner gear coupled to the second wave generator and driven by a fourth motor to drive the second wave generator.

In some embodiments, the techniques described herein relate to a fly-by-wire servo actuator, wherein the first outer shaft is coupled to the first differential and the second outer shaft is coupled to the second differential such that the first differential and the second differential are mechanically linked, and a first speed of the first differential is equal to a second speed of the second differential.

In some embodiments, the techniques described herein relate to a fly-by-wire servo actuator, wherein a first combined motor speed of the first motor and the second motor is equal to a second combined motor speed of the third motor and the fourth motor.

In some embodiments, the techniques described herein relate to a fly-by-wire servo actuator, wherein the first motor is configured to adjust a speed thereof in response to a failure in the second motor.

In some embodiments, the techniques described herein relate to a fly-by-wire servo actuator, wherein the third motor is configured to adjust a speed thereof in response to a failure in the fourth motor.

In some embodiments, the techniques described herein relate to a fly-by-wire servo actuator, wherein the output arm is a first output arm, and wherein the fly-by-wire servo actuator further include a second output arm coupled to the inner output shaft and configured to actuate the control surface of the aircraft.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the disclosure will be apparent from the following detailed description of the embodiments and the accompanying drawing figures.

BRIEF DESCRIPTION OF THE DRAWING FIGURES

Embodiments of the disclosure are described in detail below with reference to the attached drawing figures, wherein.

Figure 1:
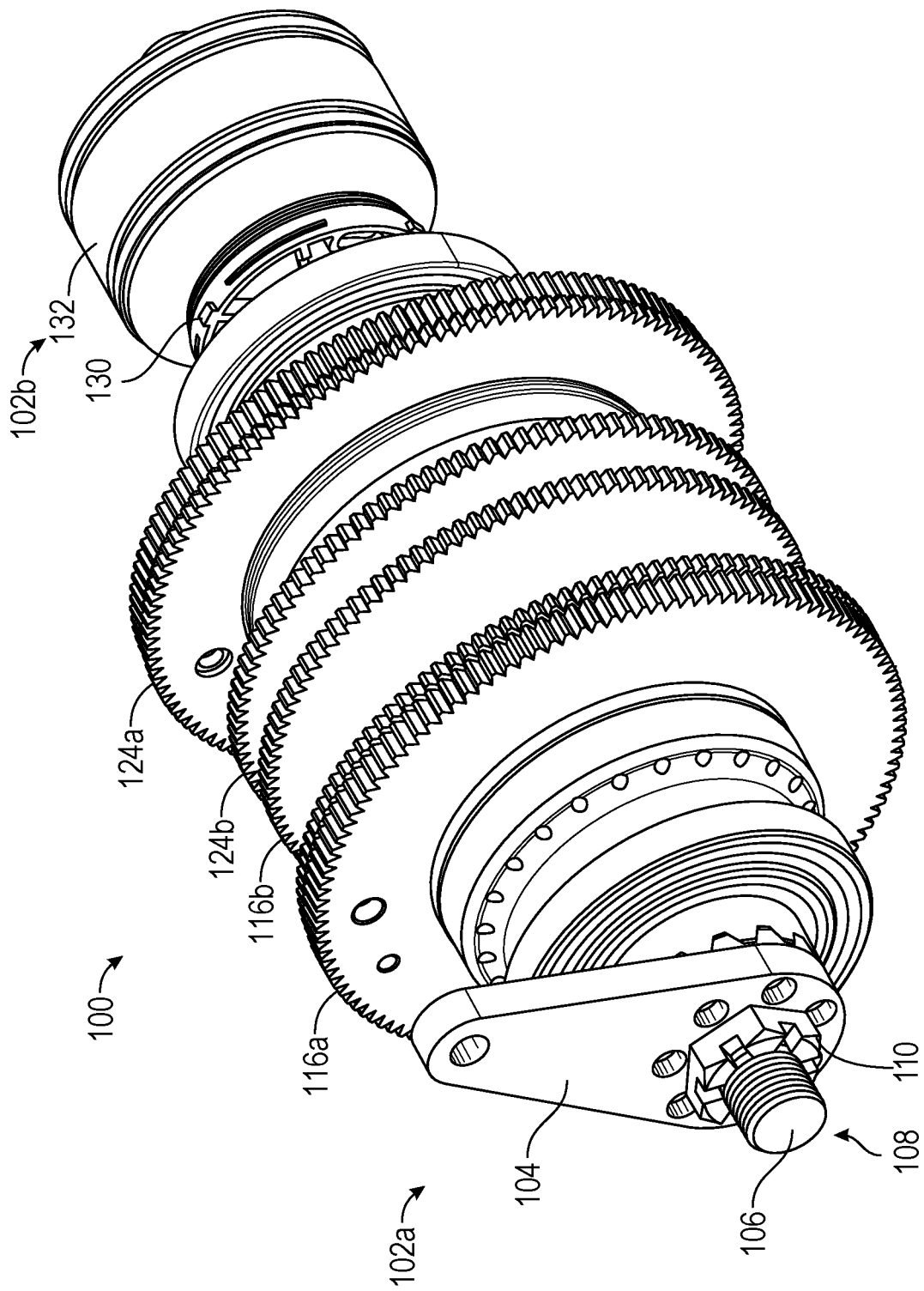
FIG. 1 depicts a drivetrain of an FBW servo actuator for some embodiments.

The drawing figures do not limit the disclosure to the specific embodiments disclosed and described herein. The drawings are not necessarily to scale, emphasis instead being placed upon clearly illustrating the principles of the disclosure.

DETAILED DESCRIPTION

The following detailed description references the accompanying drawings that illustrate specific embodiments in which the current disclosure can be practiced. The embodiments are intended to describe aspects in sufficient detail to enable those skilled in the art to practice those embodiments of the disclosure. Other embodiments can be utilized, and changes can be made without departing from the scope of the current disclosure. The following detailed description is, therefore, not to be taken in a limiting sense. The scope of the disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Generally, embodiments of the present disclosure are directed to fly-by-wire (FBW) servo actuators. FBW allows for pilot movement of flight controls to be converted into electronic signals used to control actuators to move control surfaces to a desired position based on the pilot's input. The FBW servo actuators may be used for primary flight control (e.g., control of ailerons, elevators, rudder) of aircraft. The FBW servo actuator may comprise multiple redundancies to allow for continued operation of the actuator in the event of failure of one or more components of the actuator. The failures may be due gear locking or jamming in the drivetrain of the servo actuator and/or motor failure, for example. The multiple redundancies may allow for a single servo actuator to be used to actuate a control surface rather than requiring two servo actuators. The use of a single servo actuator may be advantageous in that all components can be contained with a single housing, which improves installation and serviceability of the actuator. Furthermore, crosstalk between actuators is eliminated.

The FBW servo actuator may comprise at least one output arm coupled to and rotationally driven by an output shaft. The at least one output arm may be coupled to a pushrod, for example, that actuates a control surface. The output shaft may be driven by a first and second differential.

The first differential may comprise a harmonic gear, a first gear, and a second gear. The first gear may be driven by a first motor and may drive a circular spline of the harmonic gear. The second gear may be driven by a second motor and may drive a wave generator of the harmonic gear. A flex spline of the harmonic gear may be coupled to an outer shaft that is in turn coupled to the output shaft to actuate the output arm. The second differential may mirror the first differential and comprise a harmonic gear with a circular spline driven by a third gear (corresponding to the first gear) that is driven by a third motor. A wave generator of the harmonic gear may be driven by a fourth gear (corresponding to the second gear) that is driven by a fourth motor. A flex spline of the harmonic gear may be coupled to a second outer shaft that is likewise coupled to the output shaft of the FBW servo actuator via a second outer shaft. In some embodiments, direct drive motors may be used in place of the second and/or fourth motors to drive the wave generators.

By connecting each differential to the output shaft via the outer shafts, the speed of the first differential and the second differential may be mechanically linked. The motor speeds may be adjusted based such that the combined motor speeds of the first and second motors driving the first differential equals the combined motor speeds of the third and fourth motors driving the second differential. Thus, if the third motor fails, for example, the speed of the fourth motor can be increased to compensate for the failed motor. Accordingly, the FBW servo actuator allows for failure in gears, motors, differentials, or a combination thereof, to be compensated for by the remaining components of the actuator to ensure that flight operations are not impacted. Thus, no single point of failure exists.

Figure 2:
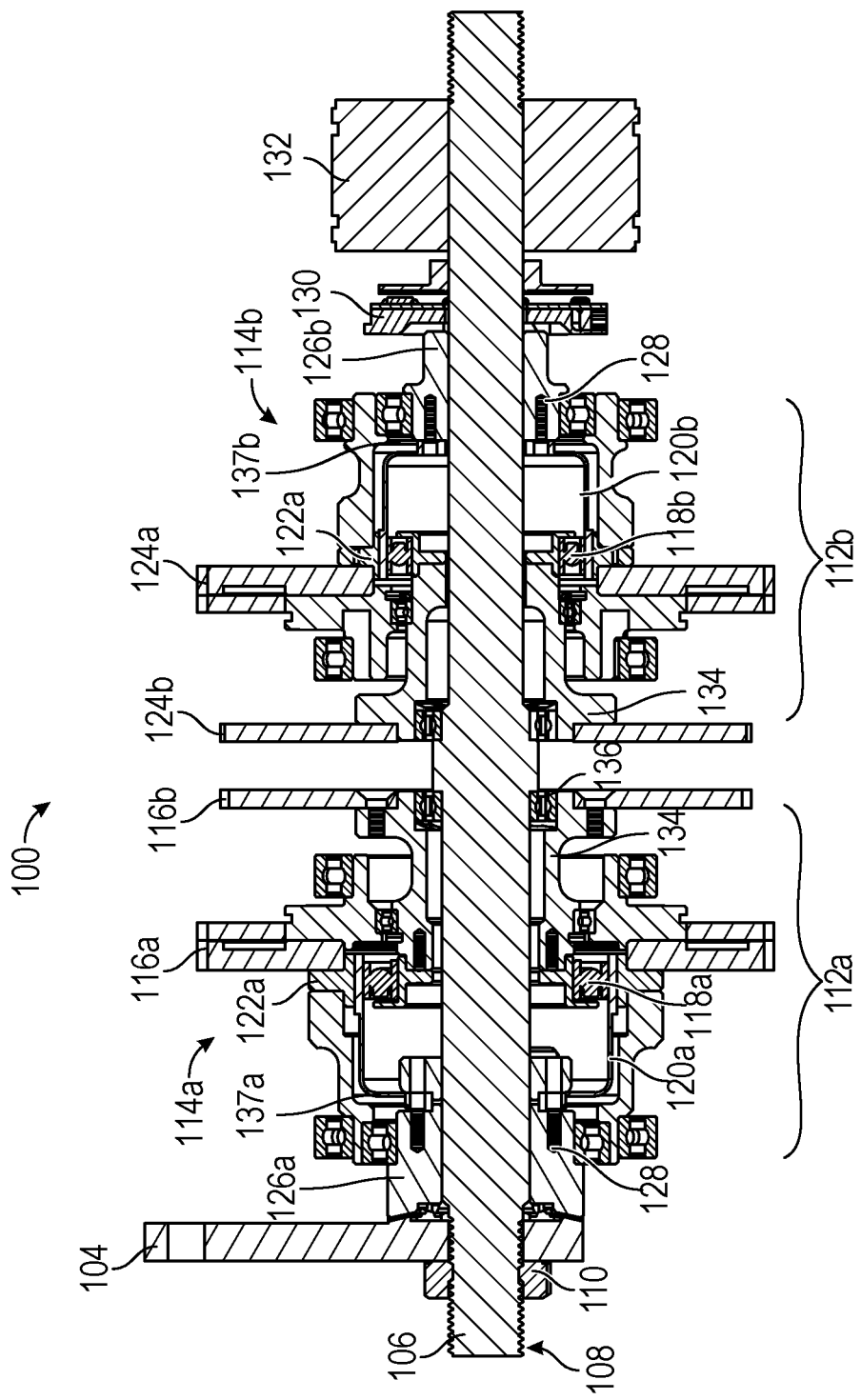
FIG. 2 depicts a cross-sectional view of the drivetrain for some embodiments.
Figure 11:
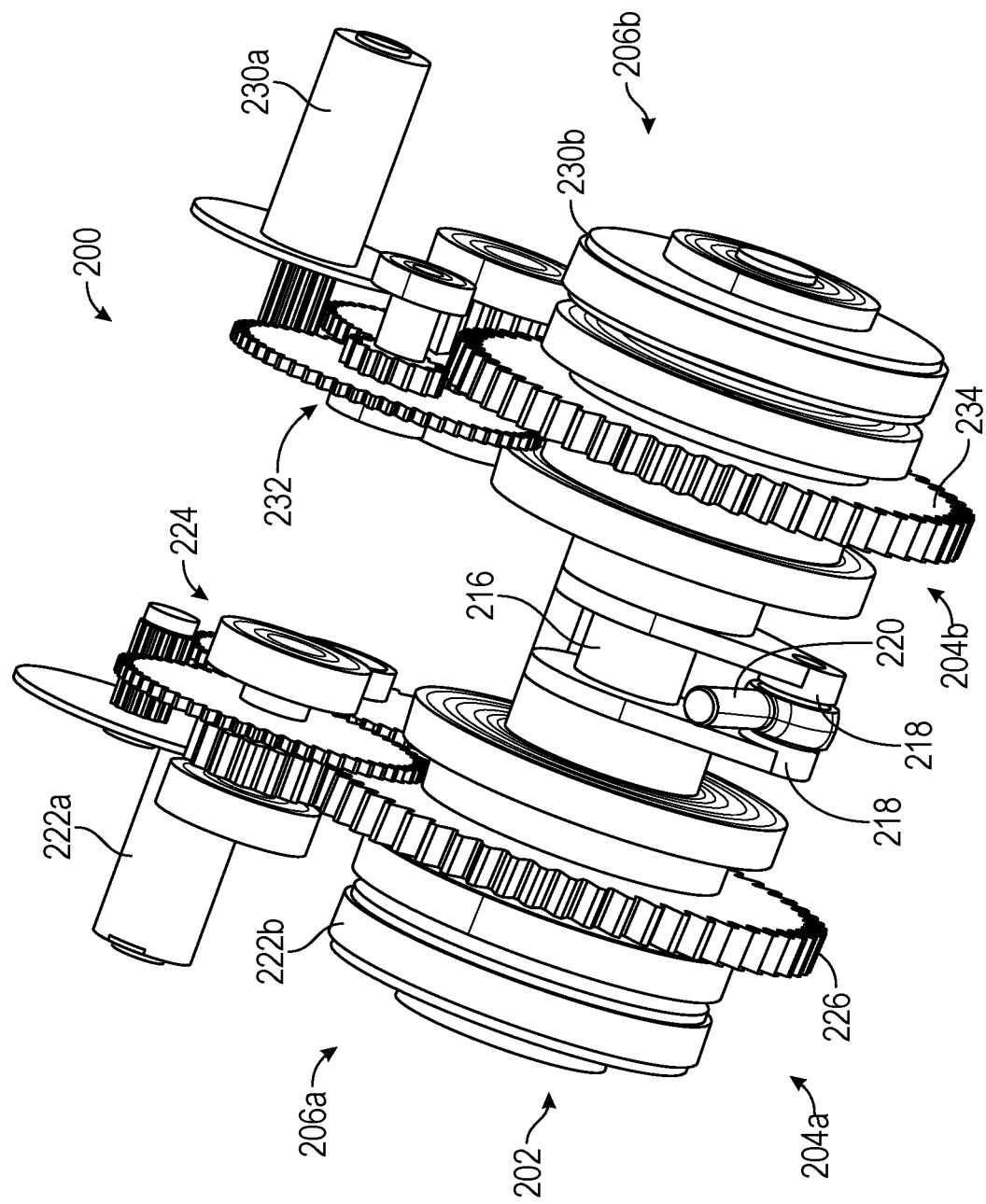
FIG. 11 depicts a drivetrain for a second FBW servo actuator for some embodiments.
Figure 12:
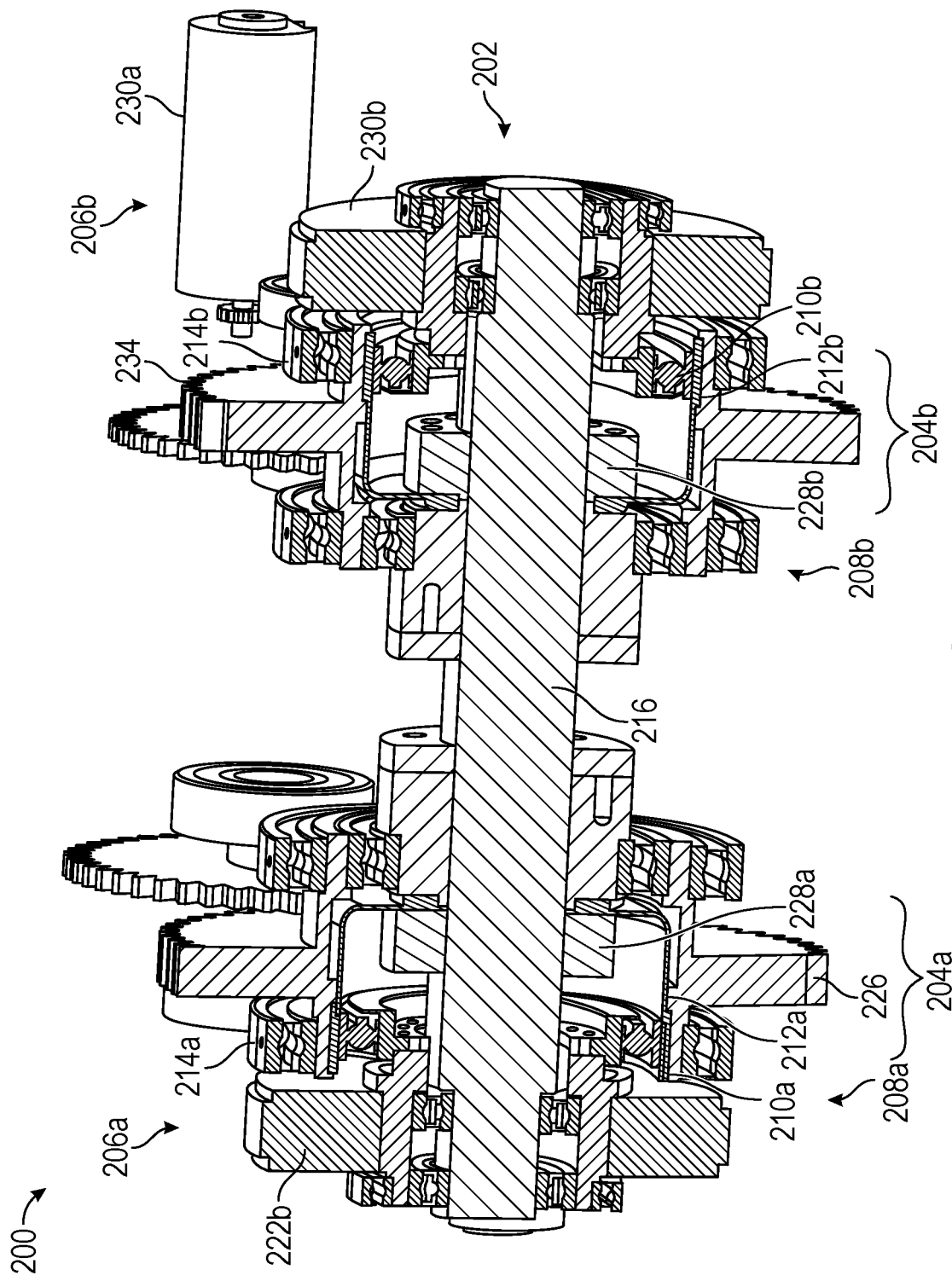
FIG. 12 depicts a cross-sectional view of the drivetrain for some embodiments.

FIGS. 1 and 2 illustrate a perspective and a cross-sectional view, respectively, of a drivetrain 100 for an FBW servo actuator for some embodiments of the present disclosure. The drivetrain 100 may comprise a front end 102*a* and a rear end 102*b*. An output arm 104 may be disposed at the front end 102*a*. The output arm 104 may be controlled by the drivetrain 100 via an inner output shaft 106 to thereby control movement of a pushrod or the like coupled to the output arm 104 (see FIG. 11). The output arm 104 may rotate about 106 to adjust the position of the pushrod. The pushrod, in turn, may control movement of a control surface, such as an aileron, elevator, or rudder. The shaft 106 may have a threaded end 108 for coupling to a nut 110, such as a castle nut or the like, to secure output arm 104 to shaft 106. The shaft 106 may extend from front end 102*a* to rear end 102*b*.

Drivetrain 100 may further comprise a front or first differential 112*a* comprising a first harmonic gear 114*a*, a first outer gear 116*a*, and a first inner gear 116*b*. The first harmonic gear 114*a* comprises a first wave generator 118*a*, a first flex spline 120*a*, and a first circular spline 122*a*. Rearward from first differential 112*a* is a rear or second differential 112*b* comprising a second harmonic gear 114*b*, a second outer gear 124*a*, and a second inner gear 124*b*. The second harmonic gear 114*b* likewise comprises a second wave generator 118*b*, a second flex spline 120*b*, and a second circular spline 122*b*. Gears 116*a*, 116*b* may be driven to drive first differential 112*a*, and gears 124*a*, 124*b* may be driven to drive second differential 112*b*. First differential 112a may be coupled to a first outer shaft 126a, and second differential 112b may be coupled to a second outer shaft 126a. As best seen in FIG. 2, shaft 106 may be received through each outer shaft 126a, 126b. Accordingly, rotational output of differentials 112a, 112b may cause corresponding rotation of the respective shafts 126a, 126b that is in turn transferred to shaft 106 to actuate output arm 104.

Each differential 112a, 112b may be coupled to a shaft 126a, 126b via one or more fasteners 128, thereby providing a fixed connection that mechanically links the rotation of outer shafts 126a, 126b to one another. In some embodiments, differentials 112a, 112b are coupled to outer shafts 126a, 126b via the flex spline 120a, 120b such that rotation of flex spline 120a, 120b causes rotation of outer shafts 126a, 126b. Accordingly, the rotational speed of differentials 112a, 112b may be equal (or near equal) even in the event of a failed component. For example, when fully operational, each differential 112a, 112b may rotate a respective outer shaft 126a, 126b at the same speed. If, for example, first differential 112a fails, second differential 112b may still be operational to drive second outer shaft 126b and, thereby, shaft 106.

Drivetrain 100 may also comprise an encoder 130 located rearward from the second outer gear 124a. The encoder 130 may be an absolute encoder. The encoder 130 may also be coupled to a resolver 132. Both the encoder 130 and the resolver 132 may be used for feedback control of drivetrain 100 and may measure angular position and/or speed of shaft 106.

Figure 3:
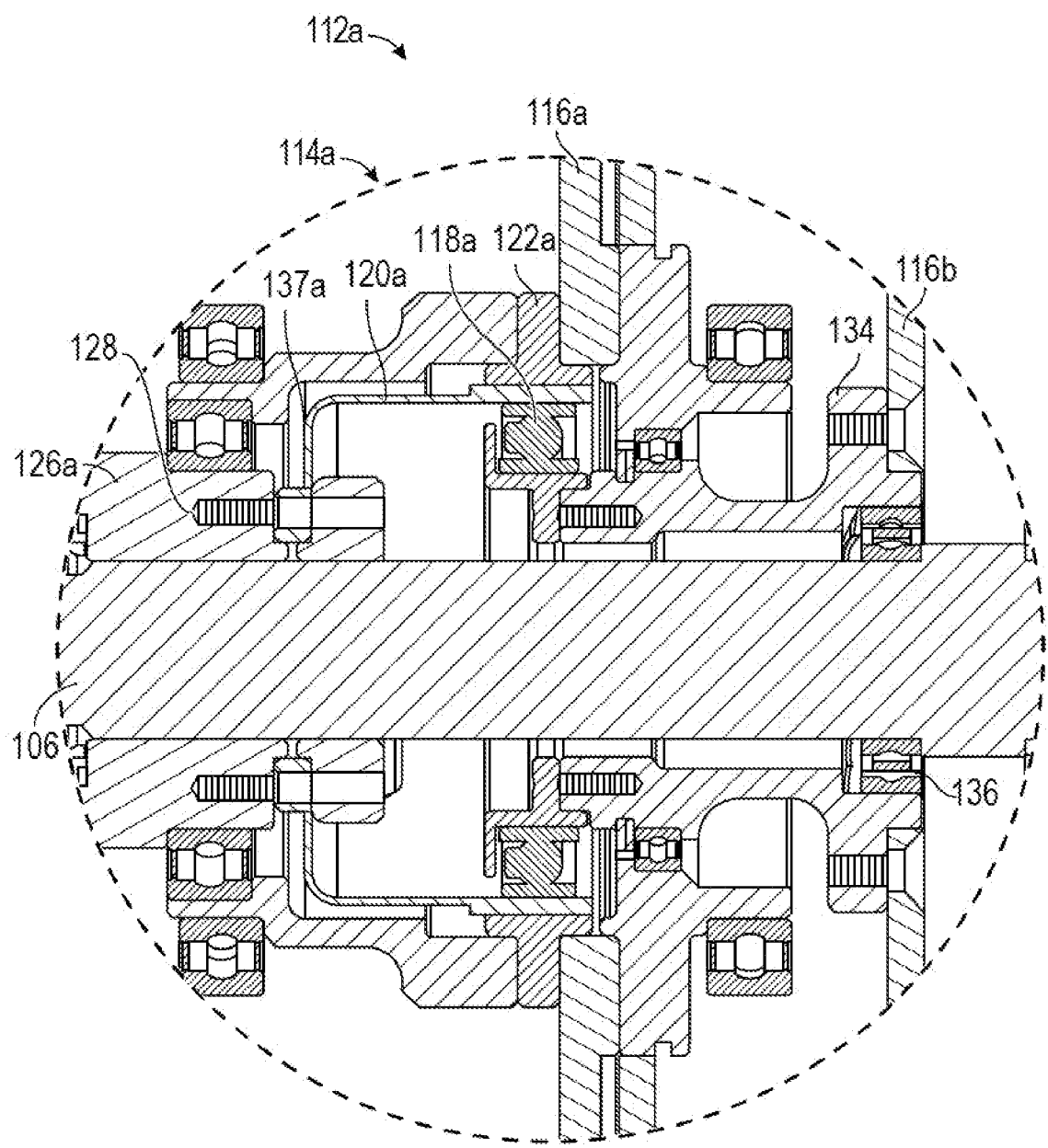
FIG. 3 depicts a cross-sectional view of a differential of the drivetrain for some embodiments.

Turning now to FIG. 3, a cross-sectional view of the first differential 112a is illustrated for some embodiments. Second differential 112b may be substantially similar to second differential 112a. Second differential 112b may be a mirror of first differential 112a. First differential 112a comprises first harmonic gear 114a, first outer gear 116a, and first inner gear 116b as discussed above. The first flex spline 120a is fixed to an outer surface of the first wave generator 118a and has external teeth (not shown) that extend radially around first flex spline 120a and mesh with corresponding interior teeth of the first circular spline 122a. The first wave generator 118a has an elliptical shape, and first flex spline 120a flexes to deform to this elliptical shape when affixed to first wave generator 118a. Accordingly, when driven, two regions of teeth of the first flex spline 120a are in contact with the circular teeth of first flex spline 120a. The two regions are on opposing sides of the major axis of the ellipse. The use of differentials 112a, 112b comprising harmonic gears 114a, 114b is advantageous because the harmonic gears 114a, 114b have zero backlash. The harmonic gears 114a, 114b also provide space savings as compared to planetary gear differentials, among other advantages as will be apparent to one of skill in the art. However, it is contemplated that a planetary gear differential may be used to drive shaft 106 without departing from the scope hereof.

The gears 116a, 116b are coupled to the first harmonic gear 114a such that the first harmonic gear 114a functions as a differential. Thus, each gear 116a, 116b may be driven by a respective motor (see FIG. 4) to provide rotational inputs to the first harmonic gear 114a. In some embodiments, first outer gear 116a drives first circular spline 122a, and first inner gear 116b drives first wave generator 118a. For example, first outer gear 116 may be coupled to an outer surface of first circular spline 122a such that rotation of first outer gear 116a causes corresponding rotation of first circular spline 122a, which then rotates first flex spline 120a due to the gear mesh between circular spline 122a and flex spline 120a. First inner gear 116b may be coupled to an inner structure 134 that is coupled to the wave generator 118a, thereby allowing first inner gear 116b to drive first wave generator 118a. The inner structure 134 may be a hollow sleeve or the like that allows shaft 106 to pass therethrough. Bearings 136 may allow rotation of inner structure 134. A wall 137a of the flex spline 120a may receive fasteners 128 to couple flex spline 120a to first outer shaft 126a such that the rotation of first flex spline 120a may be transferred to the first outer shaft 126a and from the first outer shaft 126a to the shaft 106. In some embodiments, gears 116a, 116b rotate in the same direction. In some embodiments, gears 116a, 116b rotate in opposite directions.

As previously mentioned, second differential 112b may mirror first differential 112a such that the frontmost component of first differential 112a (i.e., wall 137a) is the rearmost component (wall 137b) of second differential 112b, as shown in FIG. 3. Accordingly, on second differential 112b, second outer gear 124a may be connected to the circular spline 122b, and second inner gear 124b may be connected to wave generator 118b via a corresponding inner structure 134. In some embodiments, gears 124a, 124b rotate in the same direction. In some embodiments, gears 124a, 124b rotate in opposite directions. In some embodiments, differentials 112a, 112b rotate outer shafts 126a, 126b in the same direction. In some embodiments, differentials 112a, 112b rotate outer shafts 126a, 126b in opposite directions.

Figure 4:
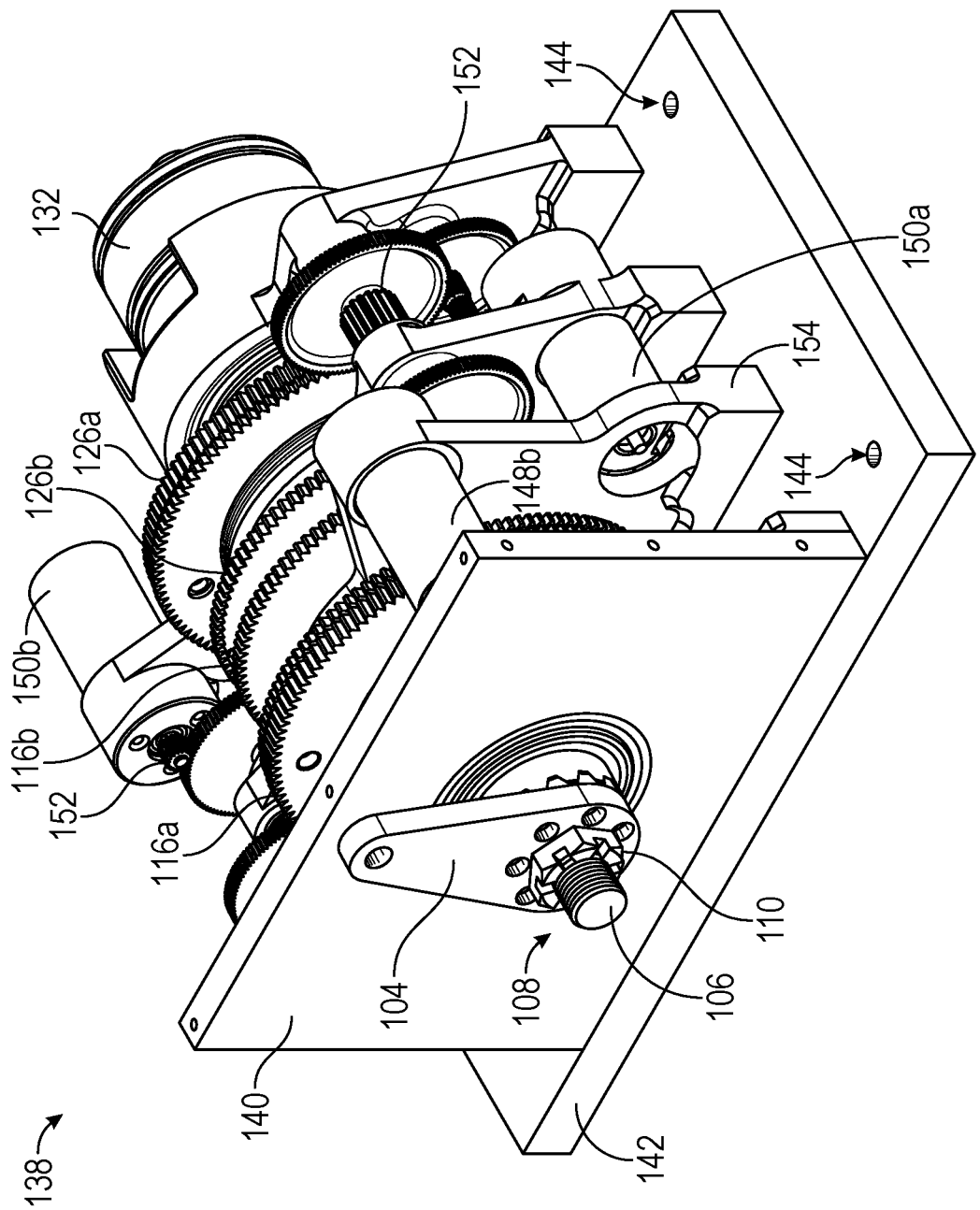
FIG. 4 depicts the FBW servo actuator for some embodiments.
Figure 5:
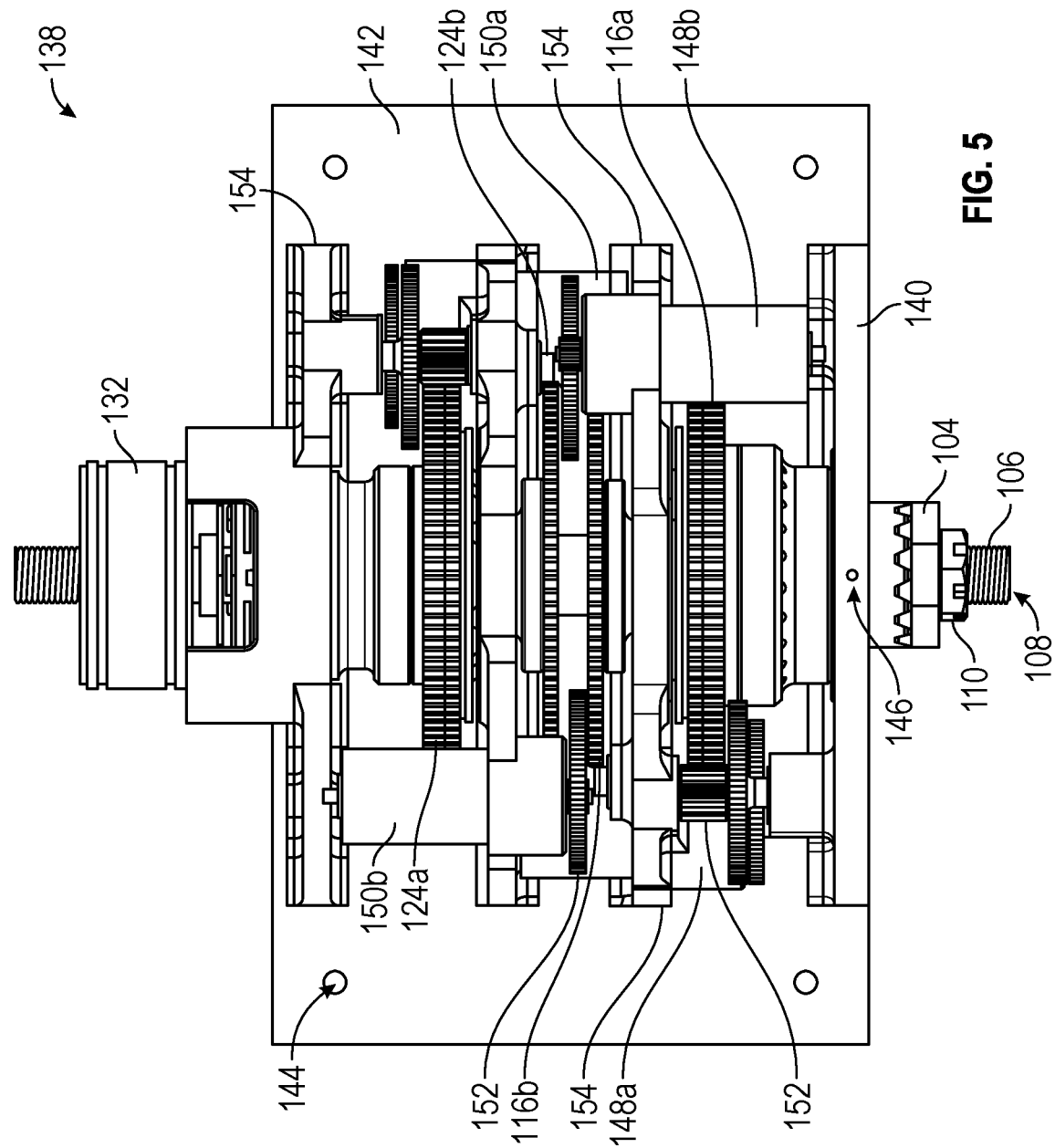
FIG. 5 depicts a top-down view of the FBW servo actuator for some embodiments.
Figure 6:
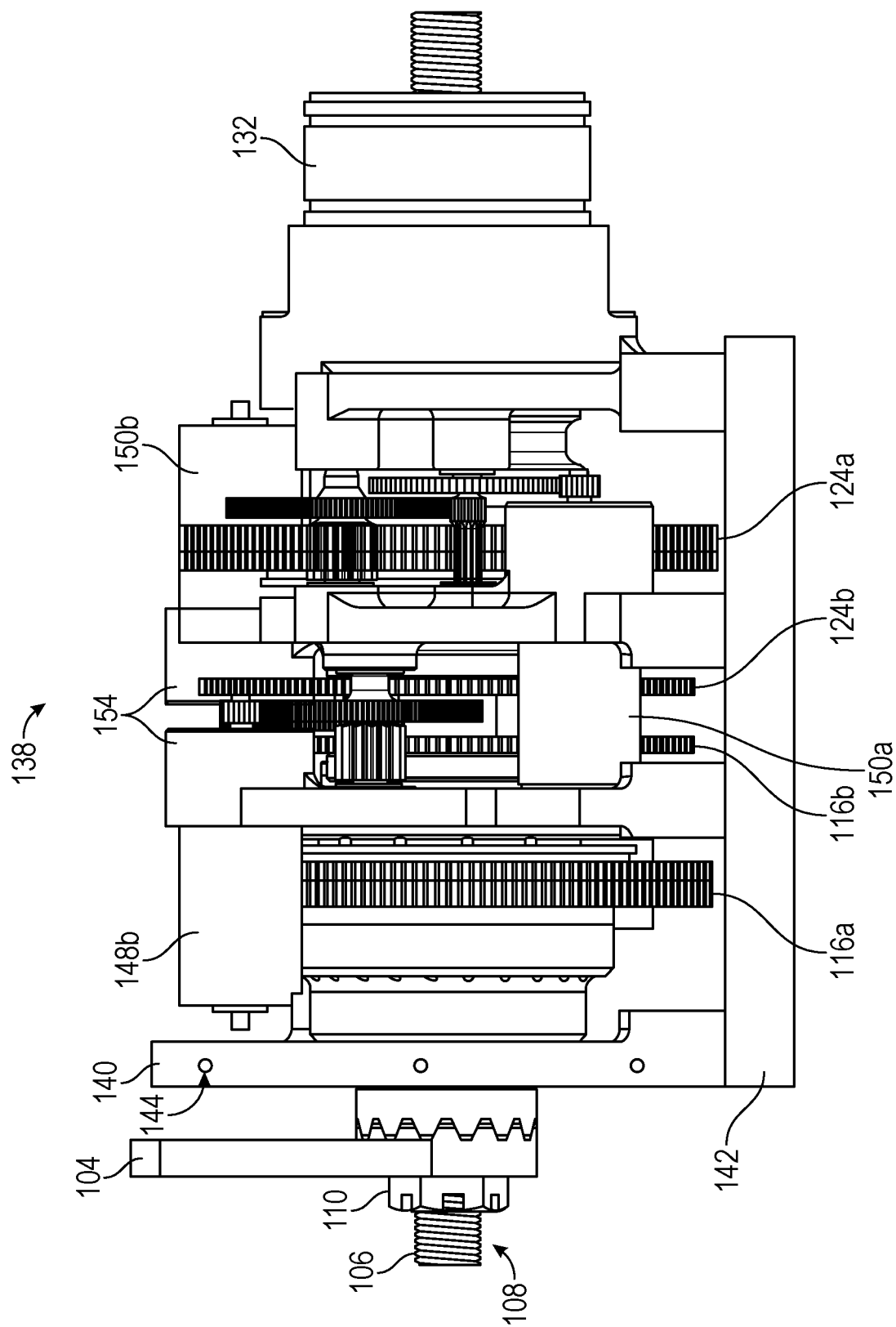
FIG. 6 depicts a side view of the FBW servo actuator for some embodiments.
Figure 7:
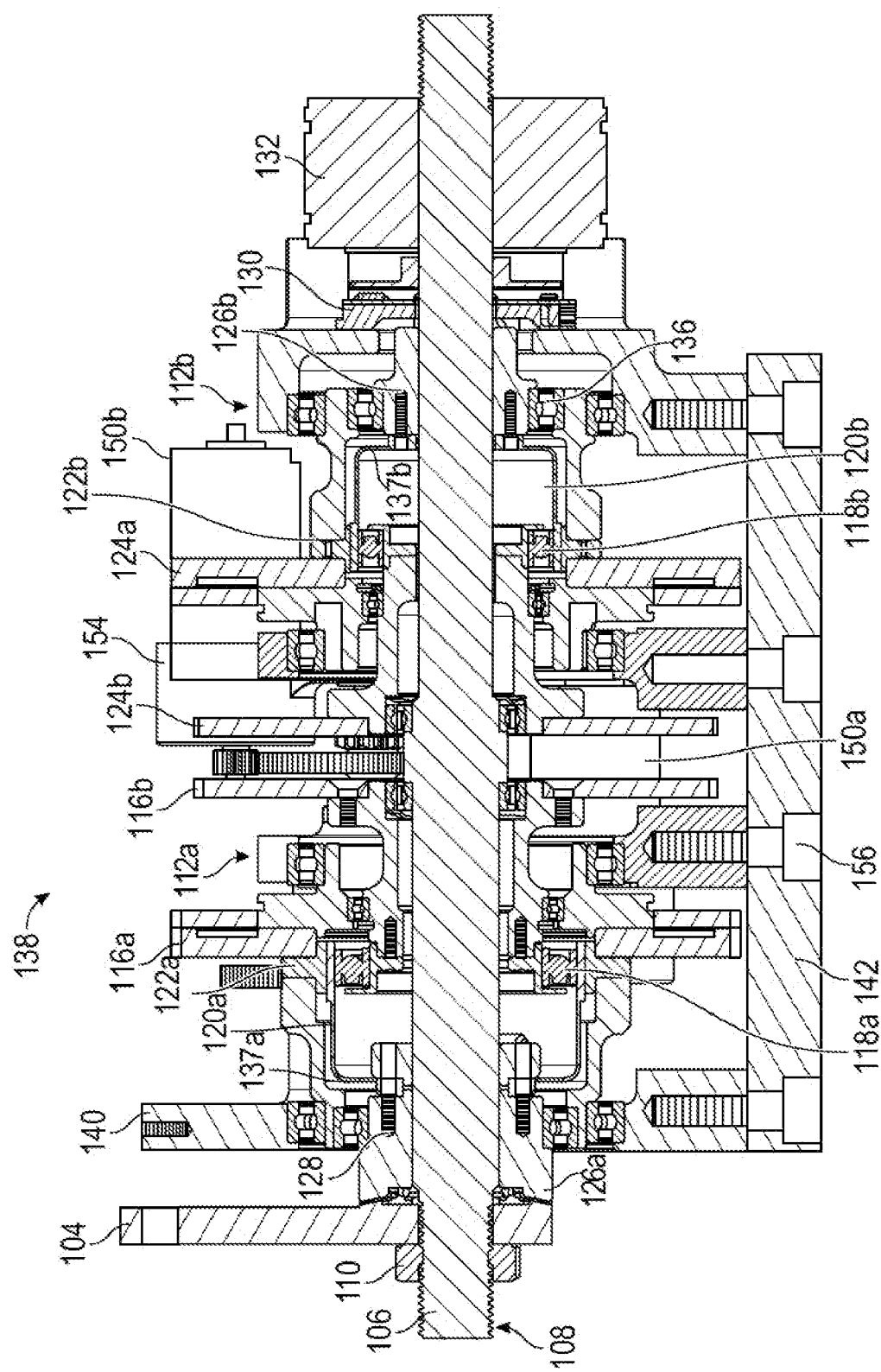
FIG. 7 depicts a cross-sectional side view of the FBW servo actuator for some embodiments.

Turning now to FIGS. 4-7, a number of views of an FBW servo actuator 138 are illustrated in accordance with embodiments of the present disclosure. Specifically, FIG. 4 is a perspective view, FIG. 5 is a top-down view, FIG. 6 is a side view, and FIG. 7 is a cross-sectional side view of FBW servo actuator 138. As shown, FBW servo actuator 138 may comprise a front wall 140 coupled to a base plate 142. Shaft 106 may extend out of front wall 140. Drivetrain 100 may be coupled to base plate 142. Base plate 142 may comprise one or more mounting holes 144 for receiving a fastener therein to couple the FBW servo actuator 138 to another surface or structure, such as within an aircraft, for example. Similarly, front wall 140 may comprise one or more mounting holes 146 for receiving a fastener therein to fasten front wall 140 to another structure, such as a housing for the FBW servo actuator 138 as shown in FIGS. 8-9.

As previously discussed, each gear 116a, 116b, 124a, 124b may be driven by a separate motor to provide redundancy in the event of failure. Thus, by providing four motors for the four input gears 116a, 116b, 124a, 124b, if one of the motors fails, only a single gear 116a, 116b, 124a, 124b is affected. If a motor does fail, all or a subset of the working motors may adjust (e.g., increase or decrease) the speed (or other motor parameter, such as power or torque) to compensate for the failed motor.

In some embodiments, FBW servo actuator 138 comprises a first outer gear motor 148a for driving first outer gear 116a, a first inner gear motor 148b for driving first inner gear 116b, a second outer gear motor 150a for driving second outer gear 124a, and a second inner gear motor 150b for driving second inner gear 124b. In some embodiments, first outer gear motor 148a is substantially similar to second outer gear motor 150a. In some embodiments, first inner gear motor 148b is substantially similar to second inner gear motor 150b. In some embodiments, first motors 148a, 148b collectively are configured to operate at the same speed as second motors 150a, 150b. That is, the sum of the motor speed for the first motors 148a, 148b may equal or be substantially equal to (e.g., within a 5% range) of the motor speed of the second motors 150a, 150b. Thus, for example, if second outer gear motor 150a fails, second inner gear motor 150b may be configured to increase the output speed to match the combined output speeds of first motors 148a, 148b. Alternatively, one or both of first motors 148a, 148b may decrease the output speed such that the combined output speed of motors 148a, 148b matches the output speed of second inner gear motor 150b. Adjustments to the motor speeds of motors 148a, 148b, 150a, 150b may occur likewise in the event of failure of any of the motors 148a, 148b, 150a, 150b. Each motor 148a, 148b, 150a, 150b may drive at least one output gear 152 that is meshed (either directly or indirectly) to the corresponding input gear 116a, 116b, 124a, 124b. Each motor 148a, 148b, 150a, 150b may also be mounted to base plate 142 via motor mounts 154. As shown in FIG. 7, one or more fasteners 156 may be inserted through base plate 142 to couple motor mounts 154 to base plate 142 and base plate 142 to front wall 140.

Figure 8:
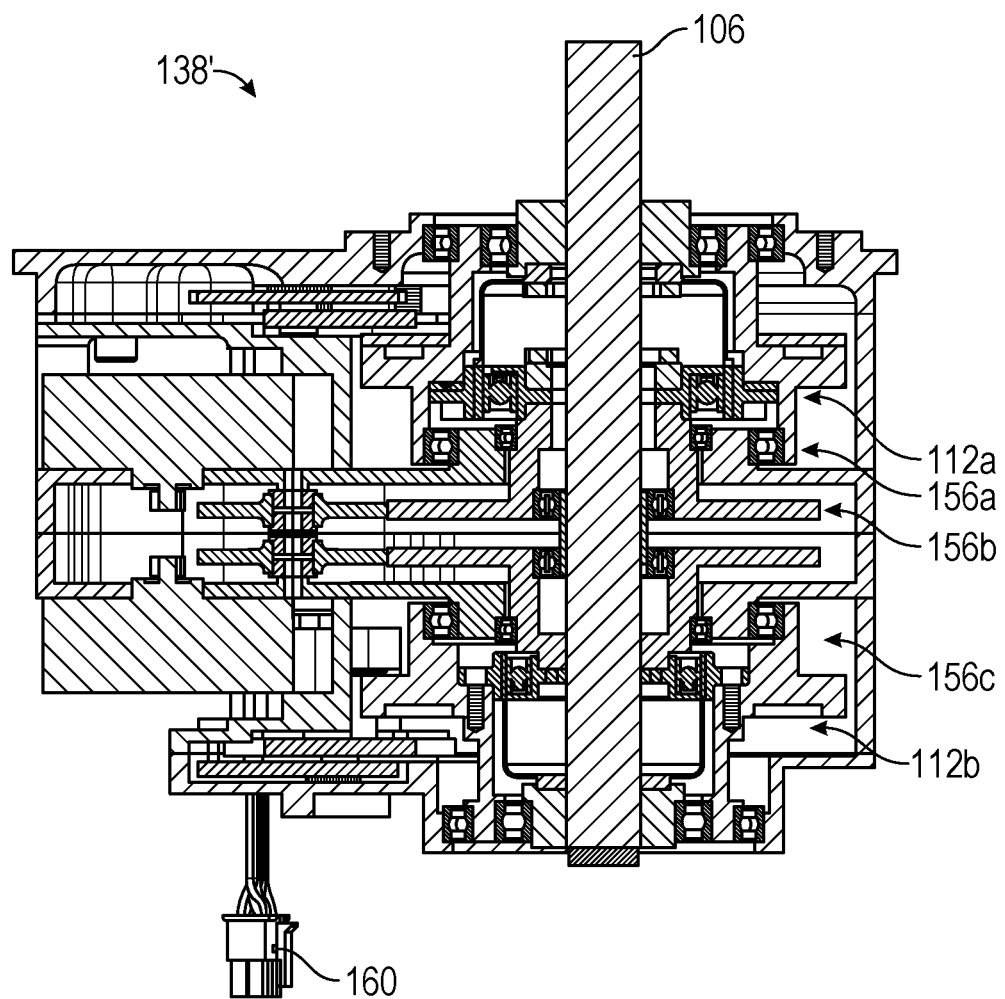
FIG. 8 depicts a cross-sectional view of the FBW servo actuator illustrating inner enclosures for the FBW servo actuator for some embodiments.
Figure 9:
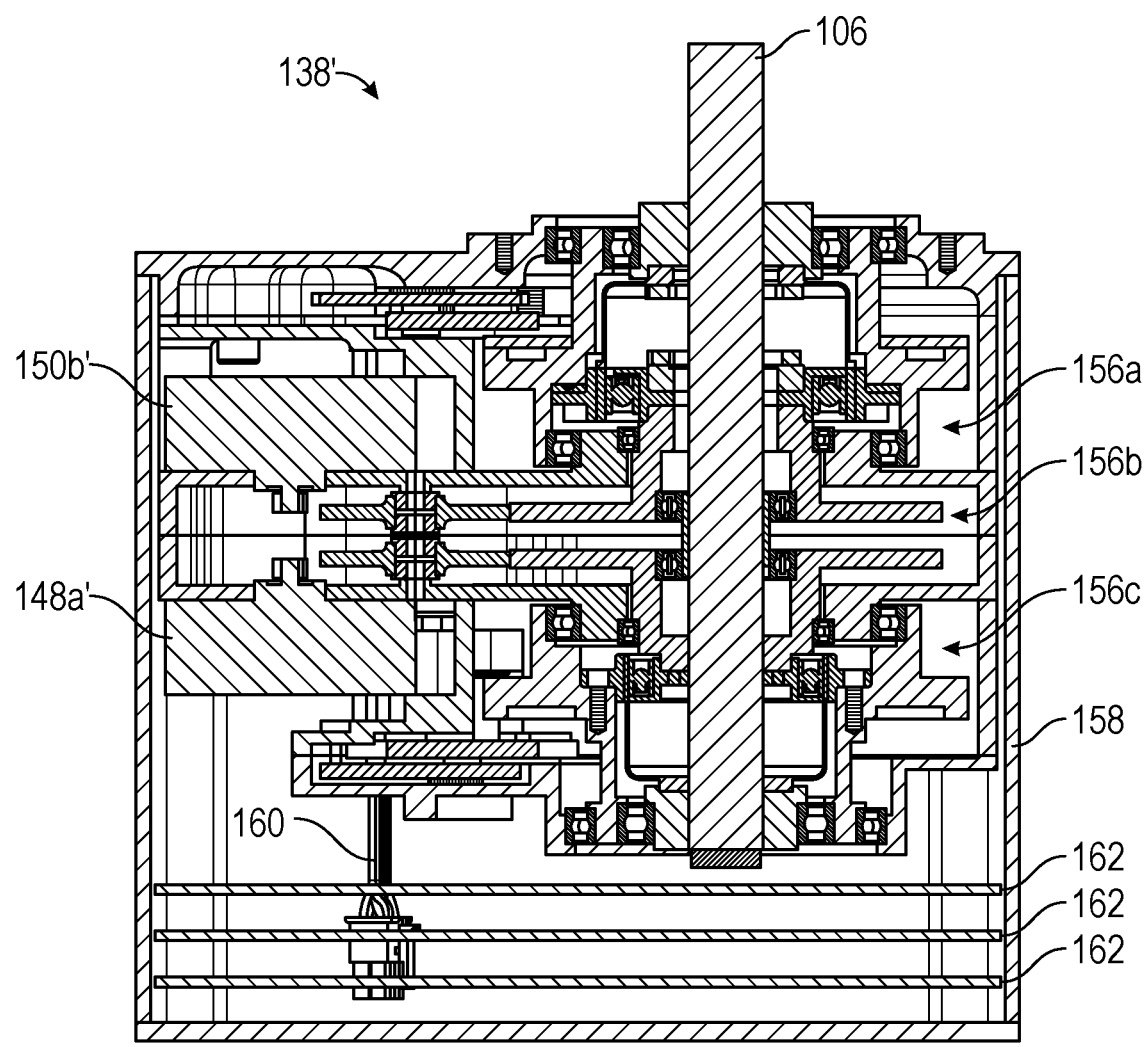
FIG. 9 depicts the cross-sectional view of the FBW servo actuator with an outer enclosure for some embodiments.
Figure 10:
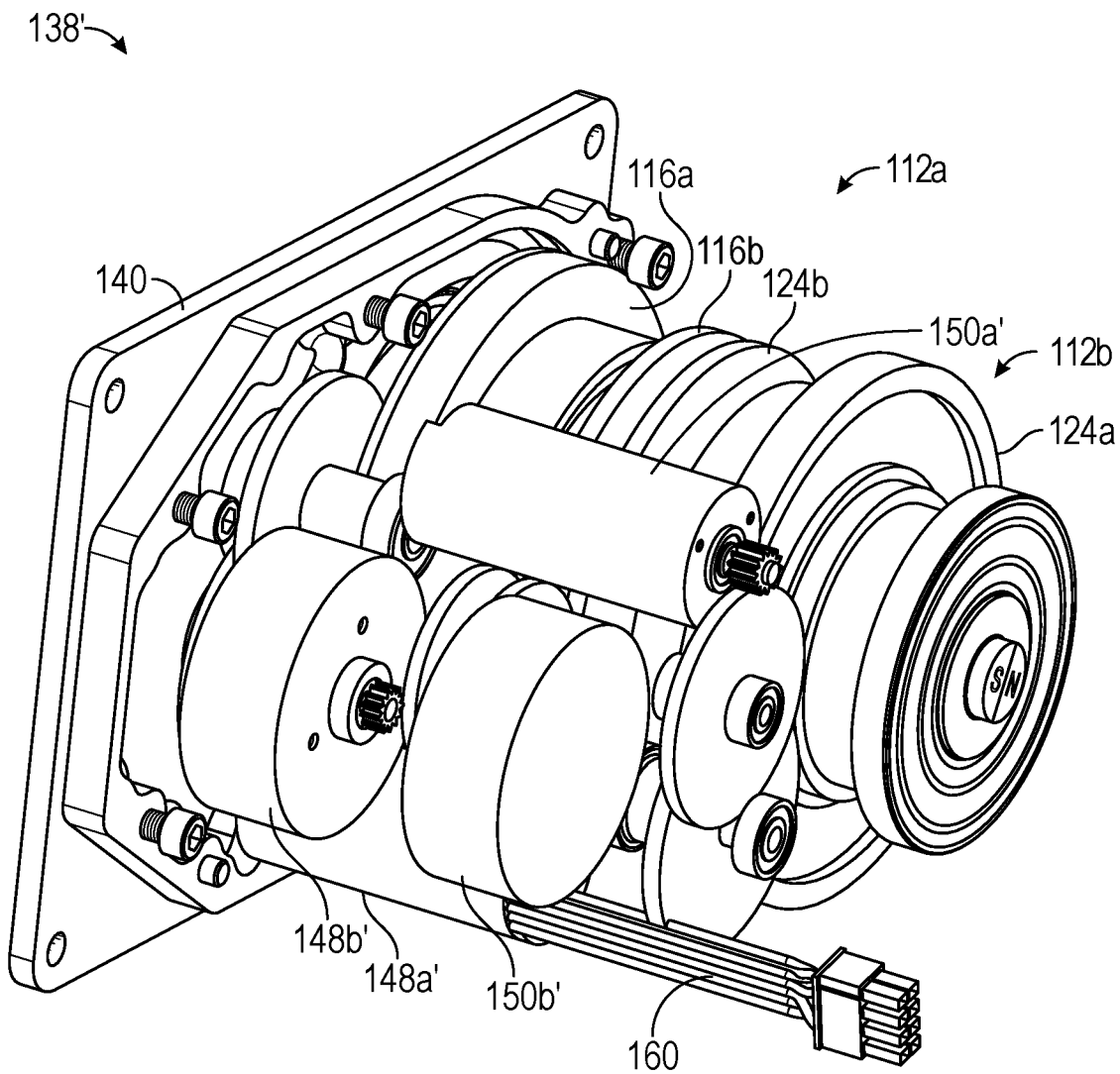
FIG. 10 depicts the FBW servo actuator for some embodiments.

Reference is now made to FIGS. 8-10, depicting an FBW servo actuator 138' in accordance with embodiments of the present disclosure. Servo actuator 138' is substantially similar to FBW servo actuator 138 discussed above; however, motors 148a, 148b, 150a, 150b (denoted as motors 148a', 148b', 150a', and 150') are arranged on a single side of drivetrain 100 as seen best in FIG. 10. FIG. 8 illustrates a top-down cross-sectional view of FBW servo actuator 138' depicting inner enclosures for some embodiments. FIG. 9 depicts a top-down cross-sectional view of FBW servo actuator 138' with inner and outer enclosures of FBW servo actuator 138' for some embodiments. FIG. 10 illustrates a perspective view of the FBW servo actuator 138' illustrated in FIGS. 8 and 9 with the enclosures hidden.

As shown in FIG. 8, FBW servo actuator 138 may comprise a front inner enclosure 156a, a middle inner enclosure 156b, and a rear inner enclosure 156c. Collectively, enclosures 156a, 156b, 156c may house drivetrain 100. The front inner enclosure 156a may house first differential 112a, and the rear inner enclosure 156c may house second differential 112b. Front inner enclosure 156a may be coupled to front wall 140. The middle inner enclosure 156b may house at least a portion of motor mounts 154 and front inner gear 116b and rear inner gear 124b in some embodiments. Shaft 106 may extend through each inner enclosure 156a, 156b, 156c. It will be appreciated that more or fewer than the three inner enclosures 156a, 156b, 156c may be employed without departing from the scope hereof. For example, a single inner enclosure may be used that encompasses drivetrain 100.

As shown in FIG. 9, an outer enclosure 158 may enclose the inner enclosures 156a, 156b, 156c. Outer enclosure 158 may also house the various electronics for FBW servo actuator 138. For example, cables 160 (e.g., motor cables, encoder cables etc.) may be housed within outer enclosure 158. In some embodiments, cables 160 are at least partially housed within inner enclosures 156a, 156b, 156c and outer enclosure 158 and may be connected to the corresponding components within enclosures 156a, 156b, 156c, as will be appreciated by one of skill in the art. Outer enclosure 158 may present a substantially box-like enclosure. Outer enclosure 158 may also house one or more PCBs 162. In some embodiments, outer enclosure 158 comprises three PCBs 162. Fewer or more PCBs 162 may be employed without departing from the scope hereof. PCBs 162 may store the necessary computer-executable instructions to control the operations of FBW servo actuator 138. For example, PCBs 162 may be communicatively coupled to motors 148a, 148b, 150a, 150b to control the operations thereof.

As previously discussed, providing a single FBW servo actuator 138 that is self-continued may reduce latency for FBW operations as crosstalk between FBW servo actuator 138 and a second servo actuator is eliminated. The use of a single actuator per control surface also provides space savings compared to using two actuators and increases the ease of installation and maintenance of the actuators.

It is one advantage of the present disclosure that drivetrain 100 and FBW servo actuator 138 may be assembled using conventional assembly techniques that ease assembling, installation, and service of FBW servo actuator 138. As discussed above, one or more fasteners 128, which may include screws bolts, pins, and the like, may be used to couple various components of drivetrain 100 to one another. For example, flex splines 120a, 120b may be coupled to outer shafts 126a, 126b as shown. Fasteners 128 may also be used to couple gears 116b, 124b to inner structure 134 and inner structure 134 to wave generators 118a, 118b. Thus, the removable fasteners 128 may allow for ease of servicing drivetrain 100 in the event of failure in a gear 116a, 116b, 124a, 124b, for example. Likewise, as discussed with respect to FIG. 7, fasteners 156 may be used to secure base plate 142 to front wall 140 and motor mounts 154. Adhesives (e.g., epoxy) may also be used to secure various components of FBW servo actuator 138. For example, adhesives may be used to secure PCBs 162 within outer enclosure 158.

FIGS. 11-14 illustrate a second FBW actuator 200 for some embodiments of the present disclosure. Like FBW servo actuator 138 discussed above, FBW actuator 200 may comprise a drivetrain 202 comprising a first differential 204a and a second differential 204b. In contrast to FBW servo actuator 138, differentials 204a, 204b may be on a first side 206a and a second side 206b, respectively, of second FBW actuator 200. Each differential 204, 206 may comprise a harmonic gear 208a, 208b. First harmonic gear 208a comprises first wave generator 210a, first flex spline 212a, and first circular spline 214a, and second harmonic gear 208b likewise comprises second wave generator 210b, second flex spline 212b, and second circular spline 214b.

Differentials 204a, 204b may drive an output shaft 216. Rotation of output shaft 216 may cause rotation of output arms 218, which are located between (e.g., equidistantly from) differentials 204a, 204b. As shown, output shaft 216 is coupled to two output arms 218, which provides further redundancy in the event of a failure in one of the output arms 218. The output arms 218, in turn, may be coupled to a pushrod 220. The pushrod 220 may be configured to actuate a control surface, as previously discussed. It is contemplated that output arms 218 may couple to more than one pushrod 220 to provide additional redundancy if a pushrod fails. Furthermore, it is contemplated that other mechanisms for actuating control surfaces, such as capstans, or other mechanical linkages, may be used without departing from the scope hereof.

In some embodiments, a first motor 222a and a second motor 222b are configured to drive first differential 204a. First motor 222a may be connected to a gear set 224 configured to mesh with an input gear 226 for driving first differential 204a. Similar to gears 116a, 124a discussed above, input gear 226 may provide input to circular spline 214a. Second motor 222b may be a direct drive motor that drives wave generator 210a. Flex spline 212a may serve as the output for differentials 204a, 204b. Flex spline 212a may be coupled to an outer shaft 228a that rotates output shaft 216. Input gear 226 and second motor 222b may rotate in the same direction or in opposite directions.

Second side 206b may be substantially similar to first side 206a. A third motor 230a may correspond to first motor 222a and drive a gearset 232 that drives an input gear 234. Input gear 234 may be substantially similar to input gear 226 and may provide input to a circular spline 214b. Likewise, a fourth motor 230b may be a direct drive motor that drives a wave generator 210b. The flex spline 212b of may be coupled to an outer shaft 228b to drive output shaft 216. Input gear 234 and fourth motor 230b may rotate in the same direction or opposite directions. Differentials 204a, 204b may cause rotation of outer shafts 228a, 228b in the same direction or opposite directions.

As with FBW servo actuator 138, the use of four motors 222a, 222b, 230a, 230b provides for redundancy in second FBW actuator 200. Thus, if a motor 222a, 222b, 230a, 230b fails, a corresponding motor can increase the output thereof to compensate for the loss of the failed motor. Additional redundancy is provided by way of multiple output arms 218 and/or multiple pushrods 220.

Figure 13:
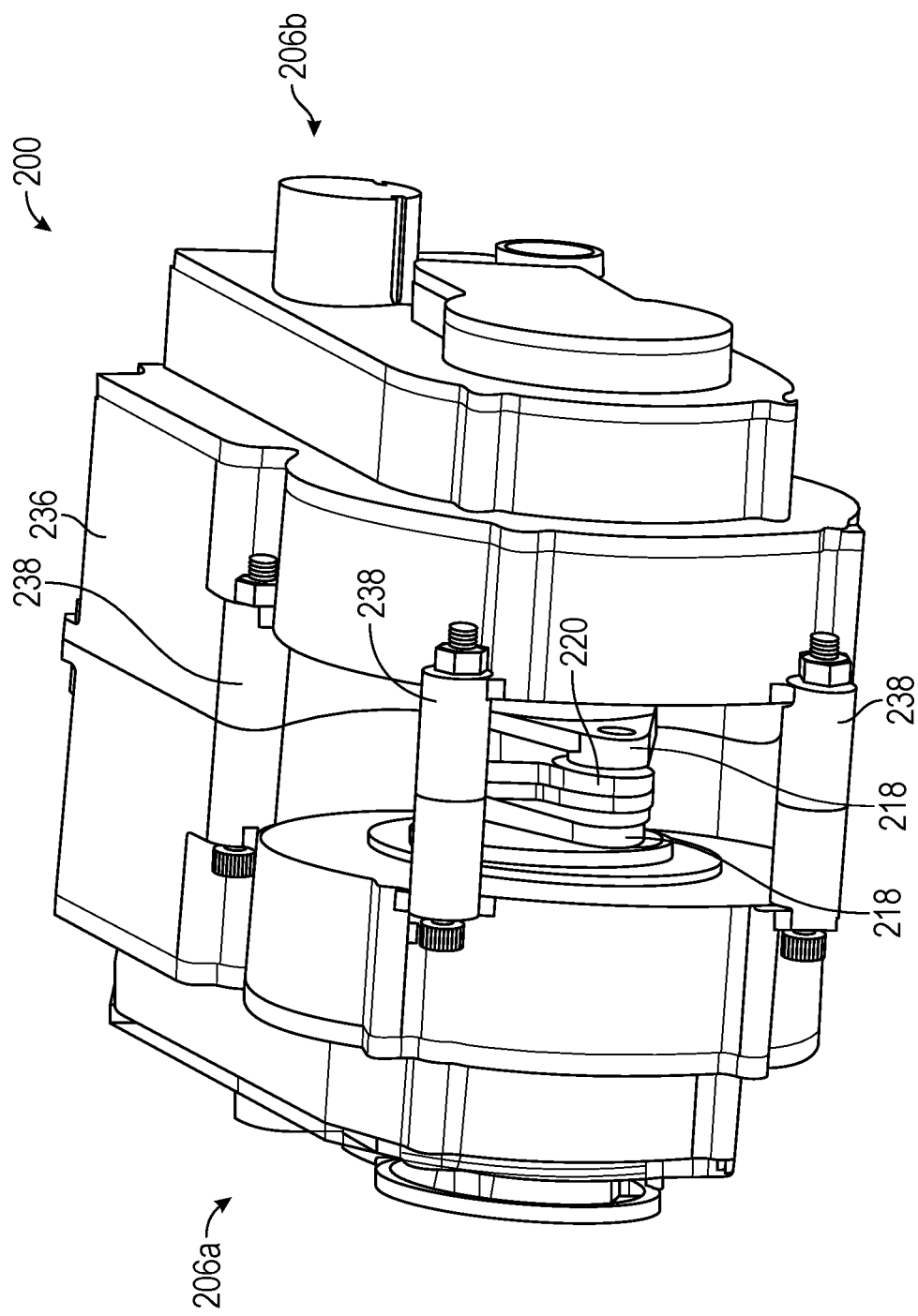
FIG. 13 depicts the second FBW servo actuator for some embodiments.
Figure 14:
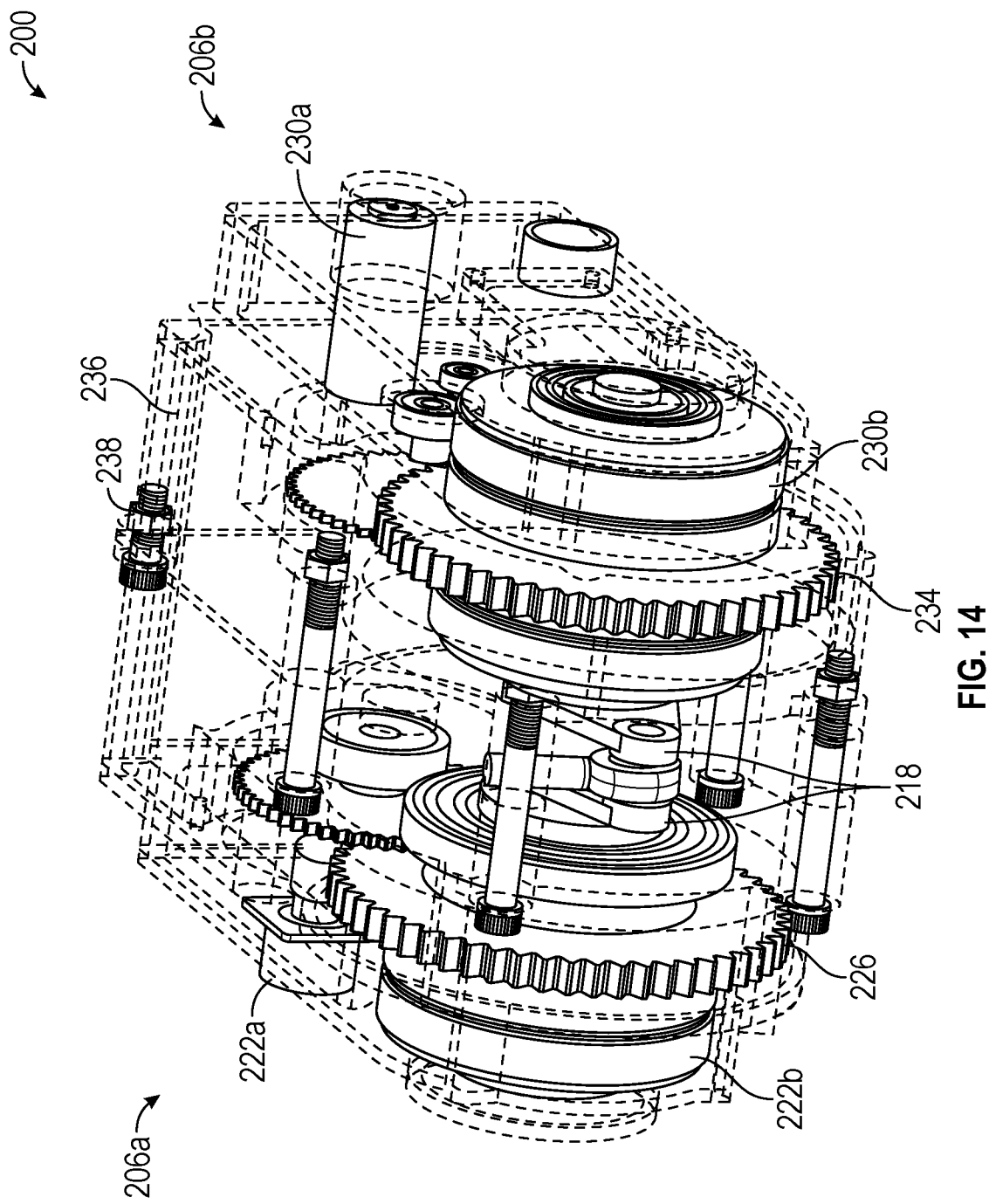
FIG. 14 depicts the second FBW servo actuator with housing depicted transparently for some embodiments.

FIG. 13 illustrates second FBW actuator 200 with a housing 236, and FIG. 14 illustrates second FBW actuator 200 with the housing 236 shown transparently as indicated by the dashed lines. In some embodiments, housing 236 is a two-piece housing coupled together by fasteners 238. For example, a first housing piece may house first side 206a, and a second housing piece may house second side 206b. Fasteners 238 may couple the first housing piece to the second housing piece. In some embodiments, output arms 218 and pushrod 220 are not contained within housing 236.

Figure 15:
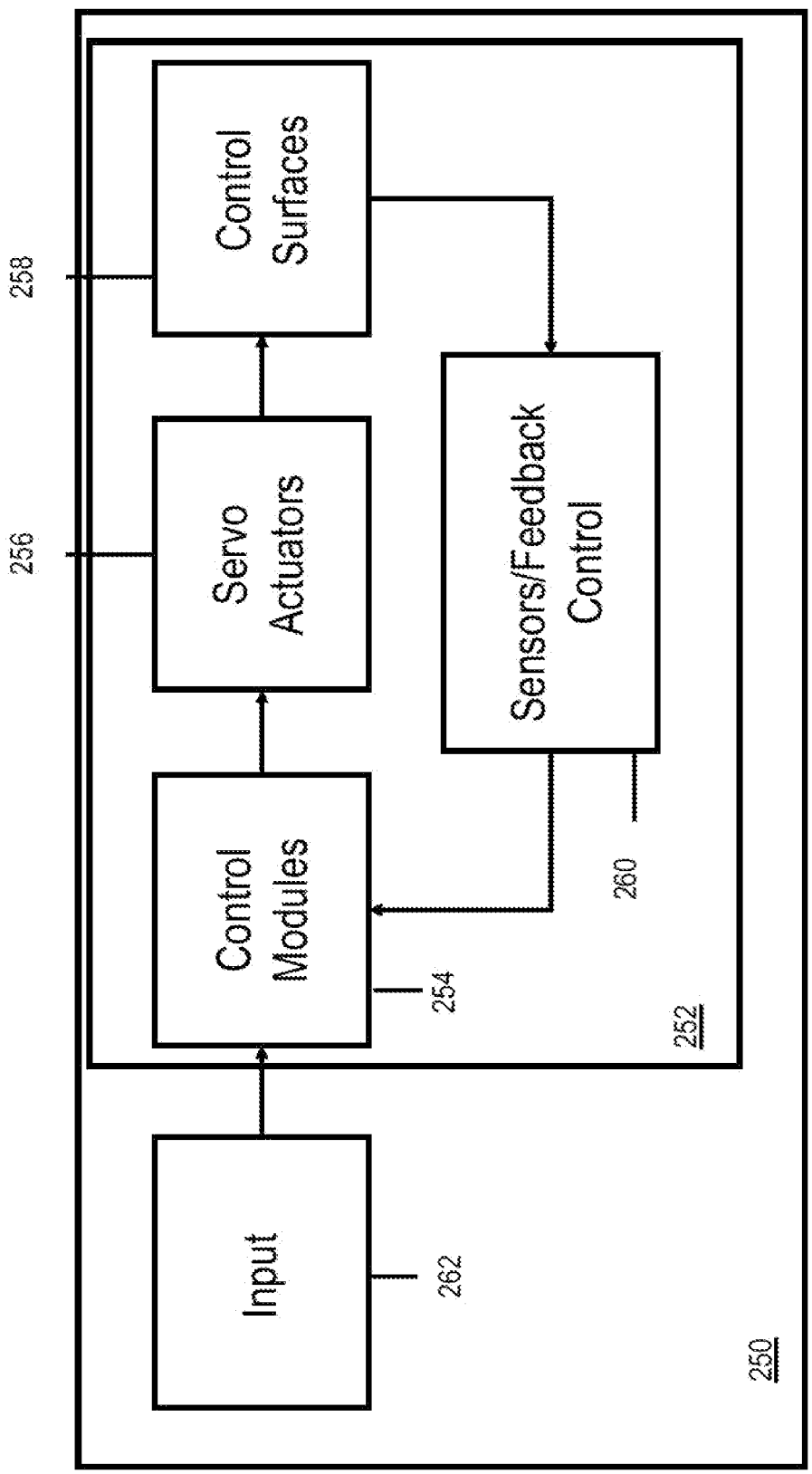
FIG. 15 depicts a block diagram in accordance with embodiments of the present disclosure.

FIG. 15 schematically depicts an aircraft 250 having a FBW system 252 in accordance with embodiments of the present disclosure. FBW system 252 may comprise control module 254, servo actuators 256, control surfaces 258, sensors/feedback control 260, or any combination thereof. Servo actuators 256 may correspond to FBW servo actuators 138, 138', 200 discussed above. Operations of servo actuators 256 may be controlled by control module 254 to actuate control surfaces 258. Control surfaces 258 may be control surfaces for primary flight control such as the ailerons, rudders, and elevators. Feedback control 260 may include sensor data and/or feedback information relating to the position/operation of control surfaces 258 that may be provided to control module 254 to adjust the operations of servo actuators 256. Thus, for example, failure and/or improper operations of gears or motors within actuators 256 may be communicated to control module 254 by feedback control 260, and control module 254 may instruct servo actuators 256 to adjust the operations thereof accordingly. Control module 254 may instruct servo actuators 256 to actuate control surfaces 258 to a desired position based on input 262 received from an operator (e.g., a pilot or autopilot system).

Although current disclosure has been described with reference to the embodiments illustrated in the attached drawing figures, it is noted that equivalents may be employed, and substitutions made herein without departing from the scope of the disclosure as recited in the claims.

Having thus described various embodiments, what is claimed as new and desired to be protected by Letters Patent includes the following.

The invention claimed is:

1. A fly-by-wire servo actuator for an aircraft, comprising:
a first outer shaft and a second outer shaft;
an inner output shaft received within the first outer shaft and the second outer shaft and configured to be drive by the first outer shaft and the second outer shaft;
an output arm coupled to the inner output shaft, the output arm configured to actuate a control surface of the aircraft;
a first differential configured to drive the first outer shaft, the first differential comprising:
a first harmonic gear comprising a first wave generator, a first flex spline coupled to the first outer shaft, and a first circular spline;
a first outer gear coupled to the first circular spline and driven by a first motor to drive the first circular spline; and
a first inner gear coupled to the first wave generator and driven by a second motor to drive the first wave generator; and
a second differential configured to drive the second outer shaft, the second differential comprising:
a second harmonic gear comprising a second wave generator, a second flex spline coupled to the second outer shaft, and a second circular spline;
a second outer gear coupled to the second circular spline and driven by a third motor to drive the second circular spline; and
a second inner gear coupled to the second wave generator and driven by a fourth motor to drive the second wave generator.

2. The fly-by-wire servo actuator of claim 1, wherein the first outer shaft is coupled to the first differential and the second outer shaft is coupled to the second differential such that the first differential and the second differential are mechanically linked, and a first speed of the first differential is equal to a second speed of the second differential.

3. The fly-by-wire servo actuator of claim 1, wherein a first combined motor speed of the first motor and the second motor is equal to a second combined motor speed of the third motor and the fourth motor.

4. The fly-by-wire servo actuator of claim 3, wherein the first motor is configured to adjust a speed thereof in response to a failure in the second motor.

5. The fly-by-wire servo actuator of claim 3, wherein the third motor is configured to adjust a speed thereof in response to a failure in the fourth motor.

6. The fly-by-wire servo actuator of claim 1,
wherein the output arm is a first output arm, and
wherein the fly-by-wire servo actuator further comprise a second output arm coupled to the inner output shaft and configured to actuate the control surface of the aircraft.

* * * * *